United States Patent [19]
Ichikawa

[11] Patent Number: 5,317,427
[45] Date of Patent: May 31, 1994

[54] IMAGE PROCESSING APPARATUS AND METHOD FOR ALLOWING THE DYNAMIC RANGE OF DIGITAL IMAGE DATA HAVING A WIDE DYNAMIC RANGE TO BE COMPRESSED WHILE PRESERVING INFORMATION OF THE DIGITAL IMAGE DATA

[75] Inventor: Kouji Ichikawa, Tokyo, Japan

[73] Assignee: Fuji Photo Film Co., Ltd., Kanagawa, Japan

[21] Appl. No.: 936,667

[22] Filed: Aug. 28, 1992

[30] Foreign Application Priority Data

Aug. 30, 1991 [JP] Japan .................................. 3-244088

[51] Int. Cl.[5] ........................ H04N 1/46; H04N 1/40; G03F 3/08
[52] U.S. Cl. ..................................... 358/520; 358/465; 358/503
[58] Field of Search ................... 358/80, 75, 461, 465, 358/466, 520, 518, 39, 31, 503, 501; 395/109

[56] References Cited

U.S. PATENT DOCUMENTS 4,812,903  3/1989  Wagensonner et al. .............. 358/80
5,170,443 12/1992  Todd .................................. 358/466

Primary Examiner—Edward L. Coles, Sr.
Assistant Examiner—Scott A. Rogers

[57] ABSTRACT

An image processing apparatus and method is provided which makes it possible to reproduce all information of digital image data having a wide dynamic range. A high frequency component of luminance image data is removed by a digital filter. The luminance image data whose high frequency component is removed is divided into highlight image data and shadow image data. Level conversion processing is performed so that the luminance level of the blackest point of the highlight image and the luminance level of the whitest point of the shadow image coincide with each other. Luminance image data is generated by synthesizing the highlight image data, the shadow image data, and the high frequency component. A thermal head is driven on the basis of the luminance image data generated and chrominance image data, to print an image.

6 Claims, 5 Drawing Sheets

IMAGE PROCESSING APPARATUS AND METHOD FOR ALLOWING THE DYNAMIC RANGE OF DIGITAL IMAGE DATA HAVING A WIDE DYNAMIC RANGE TO BE COMPRESSED WHILE PRESERVING INFORMATION OF THE DIGITAL IMAGE DATA

BACKGROUND OF THE INVENTION

1. Field of the Invention

The present invention relates to an image processing apparatus and method for a printer or the like.

2. Description of the Related Art

The dynamic range of a printer is narrower than the dynamic range of an imaging device such as a CCD (charge coupled device). Consequently if digital image data obtained from the imaging device is directly applied to the printer, a part of image information might be lost.

When an image represented by the digital image data having a wide dynamic range is printed, therefore, range conversion has been conventionally so performed using an LUT (look-up table) that the dynamic range of the digital image data falls within the dynamic range of the printer.

Since the range conversion processing of the digital image data using the LUT is one of level-compressing the whole digital image data so that the dynamic range of the digital image data falls within the dynamic range of the printer, however, the change in luminance is only suppressed as a whole. Consequently, the luminance of the digital image data low in luminance becomes lower and a part of the image represented by the image data becomes still darker, so that the image may, in some cases, be crushed.

SUMMARY OF THE INVENTION

An object of the present invention is to allow the dynamic range of digital image data having a wide dynamic range to be compressed while preserving information of the digital image data.

An image processing apparatus for a printer according to an embodiment of the present invention is characterized by comprising low-pass filtering means for removing a high frequency component of digital luminance image data applied, high frequency component extracting means for extracting the high frequency component of the above described digital luminance image data applied, dividing means for dividing the digital luminance image data whose high frequency component is removed by the above described low pass filtering means into high luminance image data and low luminance image data using a predetermined threshold value, luminance level conversion processing means for separately subjecting the above described high luminance image data and the above described low luminance image data obtained by the division by the above described dividing means to luminance level conversion processing, digital luminance image data generating means for synthesizing the above described high luminance image data and the above described low luminance image data subjected to the luminance level conversion processing by the above described luminance level conversion processing means as well as the above described high frequency component extracted by the above described high frequency component extracting means to generate digital luminance image data corresponding to one frame image, and still picture image data generating means for generating digital still picture image data from the digital luminance image data generated by the above described digital luminance image data generating means and digital chrominance component image data concerning a color applied.

An image processing method for a printer according to an embodiment of the present invention is characterized by comprising the steps of removing a high frequency component of digital luminance image data applied, subtracting from the above described digital luminance image data applied the digital luminance image data whose high frequency component is removed to generate a signal representing the high frequency component, dividing the digital luminance image data whose high frequency component is removed into high luminance image data and low luminance image data using a predetermined threshold value, separately subjecting the above described high luminance image data and the above described low luminance image data obtained by the division to luminance level conversion processing, synthesizing the above described high luminance image data and the above described low luminance image data subjected to the luminance level conversion processing as well as the above described high frequency component extracted to generate digital luminance image data corresponding to one frame image, and generating digital still picture image data from the digital luminance image data generated and digital chrominance component image data concerning a color applied.

An image processing apparatus for a printer according to an embodiment of the present invention is characterized by comprising low-pass filtering means for removing a high frequency component of an image signal applied, a high frequency component extracting circuit for extracting the high frequency component of the above described image signal applied, dividing means for dividing the image signal whose high frequency component is removed by the above described low pass filtering means into a high luminance image signal and a low luminance image signal using a predetermined threshold value, luminance level conversion processing means for separately subjecting the above described high luminance image signal and the above described low luminance image signal obtained by the division by the above described dividing means to luminance level conversion processing, and image signal generating means for synthesizing the above described high luminance image signal and the above described low luminance image signal subjected to the luminance level conversion processing by the above described luminance level conversion processing means as well as the above described high frequency component extracted by the above described high frequency component extracting circuit to generate an image signal corresponding to one frame image.

An image processing method for a printer according to an embodiment of the present invention is characterized by comprising the steps of removing a high frequency component of an image signal applied, subtracting from the above described image signal applied the image signal whose high frequency component is removed to generate a signal representing the high frequency component, dividing the image signal whose high frequency component is removed into a high luminance image signal and a low luminance image signal using a predetermined threshold value, separately subjecting the above described high luminance image signal and the above described low luminance image signal obtained by the division to luminance level conversion processing, and synthesizing the above described high luminance image signal and the above described low luminance image signal subjected to the luminance level conversion processing as well as the above described high frequency component extracted by a high frequency component extracting circuit to generate an image signal corresponding to one frame image.

An image processing apparatus according to an embodiment of the present invention is characterized by comprising dividing means for dividing digital luminance image data applied into high luminance image data and low luminance image data using a predetermined threshold value, luminance level conversion processing means for separately subjecting the above described high luminance image data and the above described low luminance image data obtained by the division by the above described dividing means to luminance level conversion processing such that the lowest luminance level of the high luminance image data is not more than the highest luminance level of the low luminance image data, and digital luminance image data generating means for synthesizing the above described high luminance image data and the above described low luminance image data subjected to the luminance level conversion processing by the above described luminance level conversion processing means to generate digital luminance image data corresponding to one frame image.

An image processing method according to an embodiment of the present invention is characterized by comprising the steps of dividing digital luminance image data applied into high luminance image data and low luminance image data using a predetermined threshold value, separately subjecting the above described high luminance image data and the above described low luminance image data obtained by the division to luminance level conversion processing such that the lowest luminance level of the high luminance image data is not more than the highest luminance level of the low luminance image data, and synthesizing the above described high luminance image data and the above described low luminance image data subjected to the luminance level conversion processing to generate digital luminance image data corresponding to one frame image.

In the foregoing description, the image signal is a concept including both digital image data and an analog video signal.

The present invention is suitable for processing of image data (an image signal) representing an image in which a relatively bright area and a relatively dark area can be clearly separated from each other on the axis of luminance. Image data whose high frequency component is removed is separated into high luminance image data representing a relatively bright are and low luminance image data representing a relatively dark area. The high luminance image data and the low luminance image data are separately subjected to level conversion processing.

Since the high luminance image data and the low luminance image data are separately subjected to level conversion processing, it is possible to separately set the dynamic ranges of the image data. More specifically, the dynamic rang after level conversion of the high luminance image data (referred to as a first dynamic range) and the dynamic range after level conversion of the low luminance image data (referred to as a second dynamic range) can be set so that the lowest luminance part of the first dynamic range and the highest luminance part of the second dynamic range coincide with each other or are partially overlapped with each other.

Even when there is a significant difference in luminance between the lowest luminance point of the high luminance image data and the highest luminance point of the low luminance image data in the image data before processing, the difference in luminance can be made zero by the above described separate level conversion processing. Consequently, a considerable amount of level compression can be achieved. More specifically, the respective ranges of the high luminance image data and the low luminance image data need not be appreciably narrowed. Since the high luminance image data and the low luminance image data are separately level-converted, it is also possible to make gray level corrections or gray scale modifications in accordance with characteristics respectively suitable for the natures of the respective image data. The image data can be thus level-converted without losing information thereof.

The high luminance image data and the low luminance image data thus separately level-converted, along with high frequency component data, are finally combined or synthesized. Since the high frequency component data is not level-compressed, a precise expression in the image is preserved. Since the difference in luminance between the high luminance area and the low luminance area is decreased, the ranges of the change in luminance in the respective areas are hardly narrowed. In an image represented by image data finally obtained, therefore, both its bright and dark parts are clearly expressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
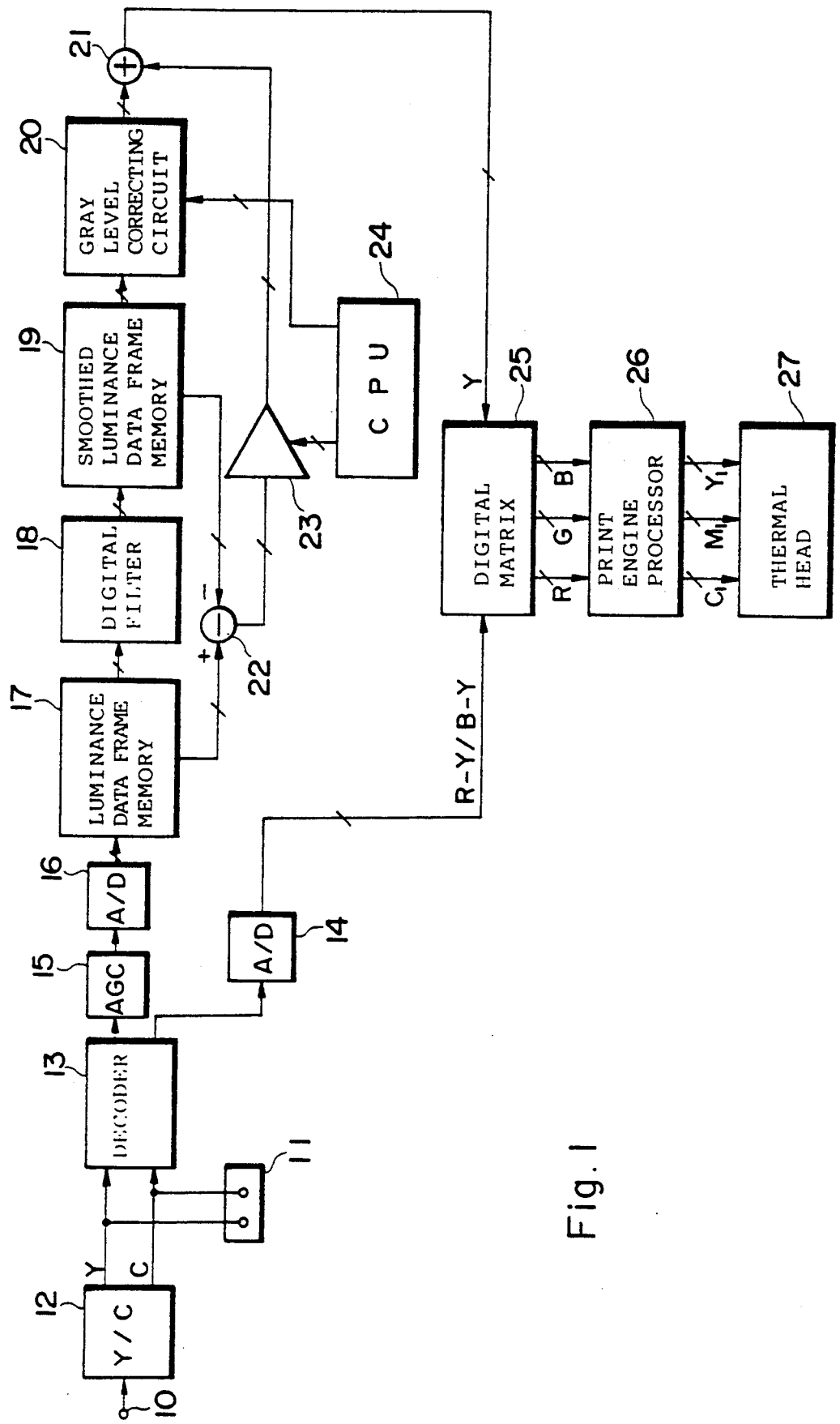
FIG. 1 is a block diagram showing the electrical construction of a video image printer showing an embodiment of the present invention.
Figure 2:
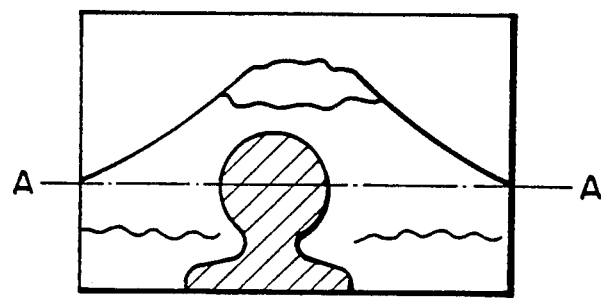
FIG. 2 shows an example of an image to be printed.

FIG. 1 is a block diagram showing the electrical construction of a video image printer showing an embodiment of the present invention. FIG. 2 shows an example of an image to be printed, and FIGS. 3a to 3i show the change in luminance corresponding to a line A—A shown in FIG. 2.

A video image printer includes a video signal input terminal 10. A video signal is applied to the video signal input terminal 10. The video signal applied to the video signal input terminal 10 is fed to a luminance signal/- chrominance signal (Y/C) separating circuit 12. In the Y/C separating circuit 12, the video signal is separated into a luminance signal Y and a chrominance signal C. The luminance signal Y and the chrominance signal C are fed to a decoder 13.

The video image printer also includes a luminance signal/chrominance signal (Y/C) input terminal 11. The luminance signal Y and the chrominance signal C are applied to the Y/C input terminal 11. The luminance signal Y and the chrominance signal C applied to the Y/C input terminal 11 are also applied to the decoder 13.

The decoder 13 is for generating color difference line sequential signals R-Y and B-Y and a luminance signal Y from the inputted luminance signal Y and the chrominance signal C to output the generated signals. The luminance signal Y and the color difference line sequential signals are respectively fed to an automatic gain control circuit 15 and an analog-to-digital (A-D) converter 14. The automatic gain control circuit 15 is for adjusting the level of the luminance signal Y inputted. The luminance signal Y whose level is adjusted is fed to an A-D converter 16. The analog luminance signal inputted to the A-D converter 16 is converted into digital luminance data. The digital luminance data is applied to a luminance data frame memory 17 and stored once therein. In addition, the analog color difference line sequential signals inputted to the A-D converter 14 are respectively converted into digital color difference line sequential data. The digital color difference line sequential data are applied to a digital matrix circuit 25.

In this video image printer, the digital luminance image data is divided into data in a highlight image area (high luminance image area) and data in a shadow image area (low luminance image area) after its edge component (high frequency component) is removed, and a gray level correction or gray scale modification is made for each data. Thereafter, the edge component is added to the digital luminance image data subjected to the gray level corrections, to generate luminance image data corresponding to one frame image. An image is printed on the basis of the luminance image data generated. Therefore, the video image printer includes a digital filter 18, a smoothed luminance data frame memory 19, a gray level correcting circuit 20, an adder 21, a subtracter 22, an amplifier 23, and a CPU (central processing unit) 24.

Figure 3A:
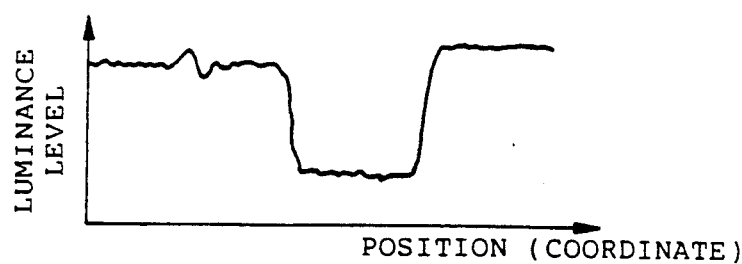
FIGS. 3a to 3a show the change in luminance corresponding to a line A—A shown in FIG. 2, which respectively represent digital luminance data in blocks shown in FIG. 1.
Figure 3B:
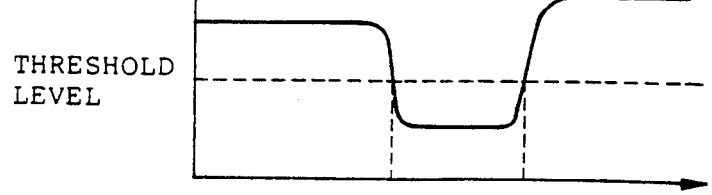

The digital luminance data stored once in the luminance data frame memory 17 (see FIG. 3a) is applied to the digital filter 18. In the digital filter 18, an edge component of the digital luminance data is removed so that the digital luminance data is smoothed as shown in FIG. 3b. The smoothed digital luminance data is applied to the smoothed luminance data frame memory 19 and stored once therein and then, is applied to the gray level correcting circuit 20.

Figure 3C:
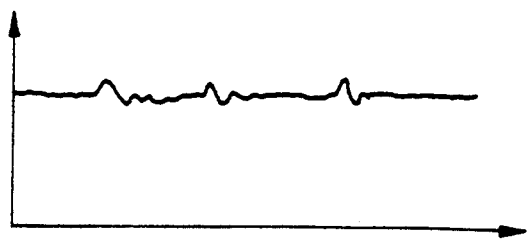

The luminance data stored once in the luminance data frame memory 17 and the smoothed luminance image data stored once in the smoothed luminance data frame memory 19 are applied to the subtracter 22. In the subtracter 22, the smoothed luminance image data is subtracted from the luminance data stored once in the luminance data frame memory 17. Consequently, the edge component of the digital image data is extracted as shown in FIG. 3c. The edge component extracted is applied to the amplifier 23. In the amplifier 23, the edge component is amplified. The amplified edge component is applied to the adder 21.

Figure 3D:
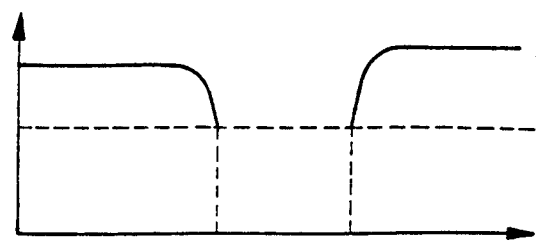
Figure 3E:
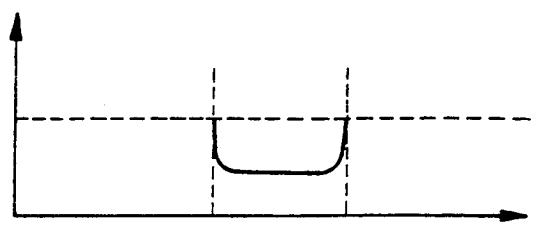
Figure 4:
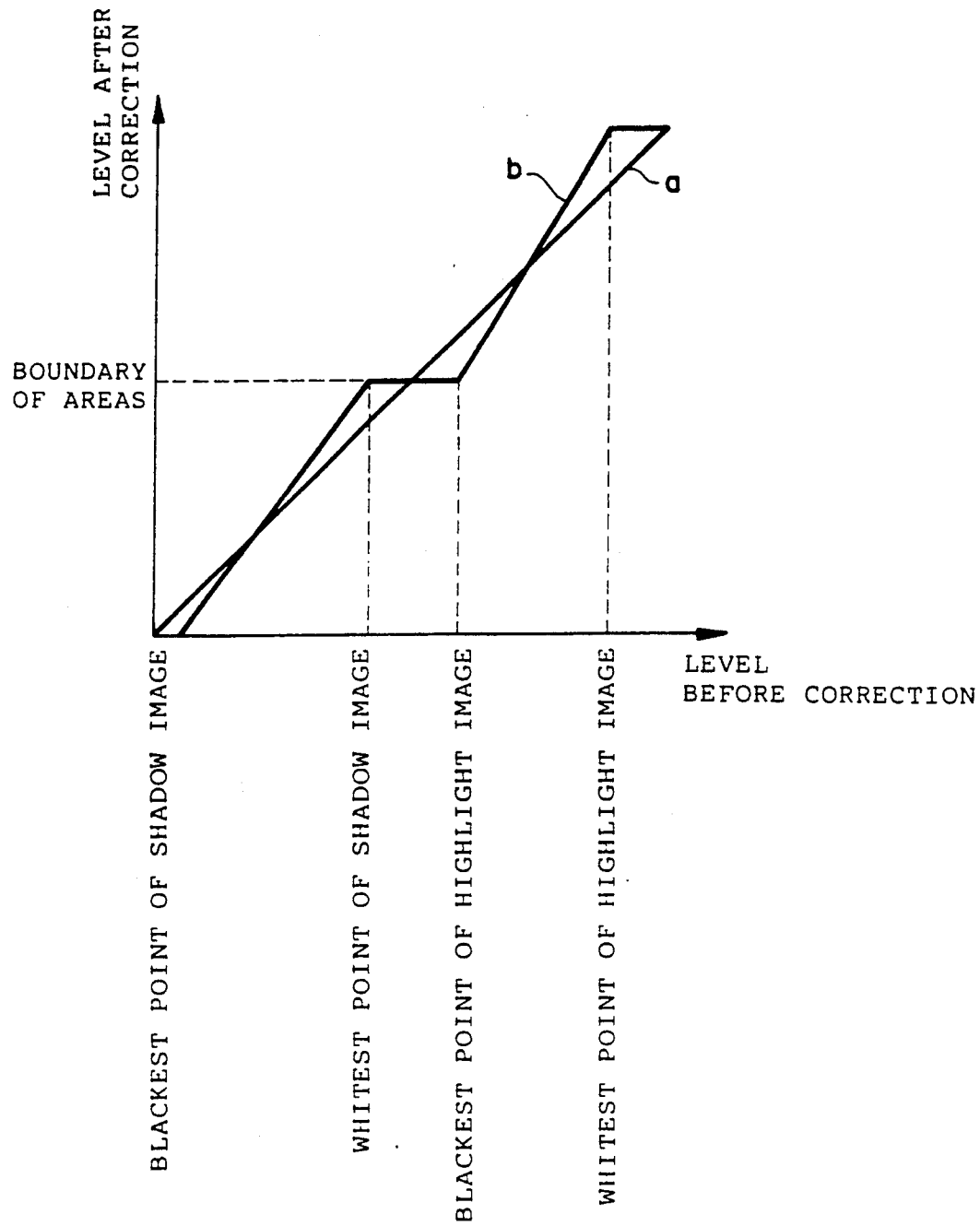
FIG. 4 is a graph showing gray level correction characteristics based on the whitest and blackest points.
Figure 5:
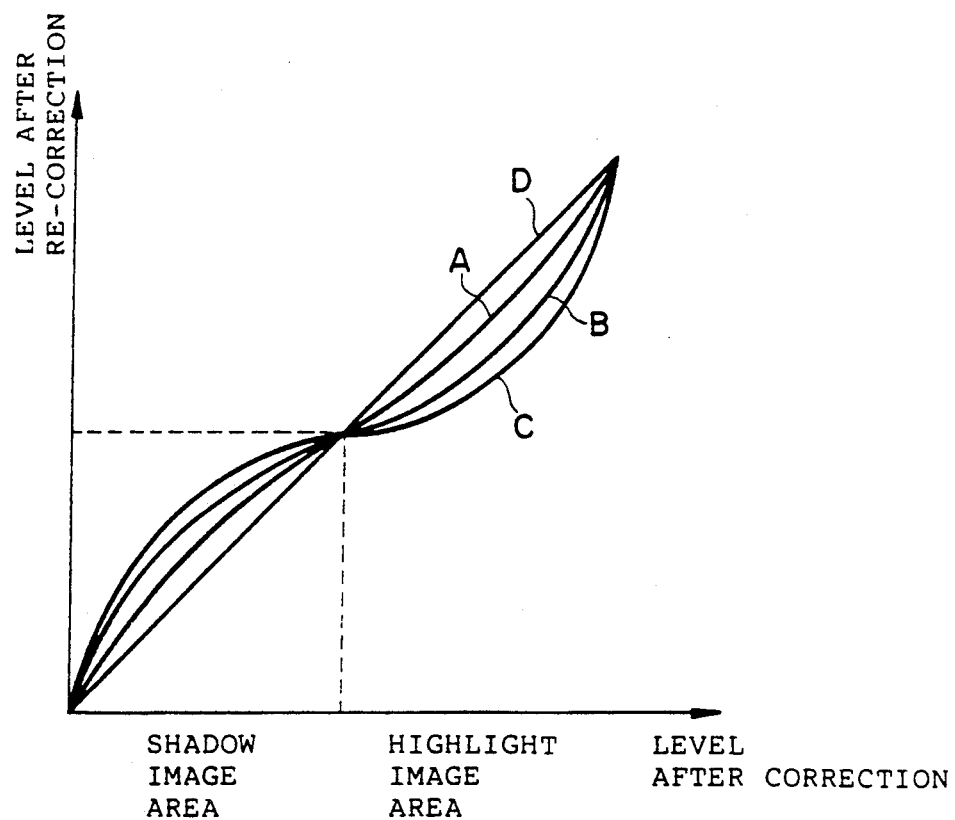
FIG. 5 is a graph showing gray level correction characteristics based on the average luminance.

FIGS. 4 and 5 show the gray level correction characteristics of the gray level correcting circuit 20. In the gray level correcting circuit 20, the digital luminance image data is divided into data representing a highlight image area which is brighter than a predetermined threshold level as shown in FIG. 3d and data representing a shadow image area which is darker than the predetermined threshold level as shown in FIG. 3e, and a gray level correction is made for each data. Furthermore, in the gray level correcting circuit 20, two gray level corrections are made, that is, a gray level correction based on the whitest points at the highest luminance level and the blackest points at the lowest luminance level of the highlight image and the shadow image, as shown in FIG. 4, and a gray level correction based on the average luminance of the highlight image and the average luminance of the shadow image, as shown in FIG. 5. In FIG. 4, a graph indicated by a sign a is a graph of the conventional gray level correction characteristics, and a graph indicated by a sign b is a graph of the gray level correction characteristics according to the embodiment of the present invention.

Referring to FIG. 4, the digital luminance data representing the highlight image area and the digital luminance data representing the shadow image area are respectively divided in the gray level correcting circuit 20, so that respective luminance data at the whitest points and the blackest points of the highlight image and the shadow image are detected by sampling. Level conversion processing is performed so that the levels of the luminance data at the blackest point of the highlight image and the luminance data at the whitest point of the shadow image out of the detected luminance data at the blackest points and the whitest points coincide with each other. Since the levels of the luminance data a the blackest point of the highlight image and the luminance data at the whitest point of the shadow image coincide with each other, the difference in luminance between the luminance data can be compressed, thereby making it possible to compress the dynamic range of the digital image data.

After the gray level correction based on the luminance levels of the whitest and blackest points are made, the gray level correction based on the average luminance is made. The gray level correction based on the average luminance is so made that the average luminance is high with respect to the shadow image, while being low with respect to the highlight image, with reference to FIG. 5. It is possible to make in three stages the gray level correction based on the average luminance, as represented by signs A to C in the present embodiment. Alternatively, it is also possible to make no gray level correction, as represented by a sign D. The control is carried out by the CPU 24.

Figure 3F:
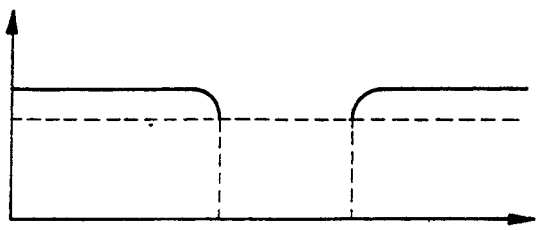
Figure 3G:
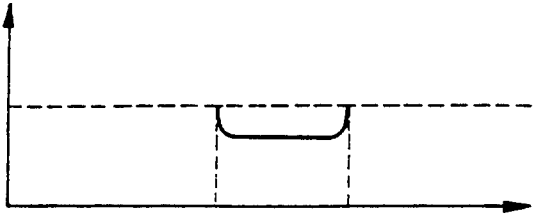

By the gray level correcting circuit 20, a gray level correction is made as shown in FIG. 3f with respect to the highlight image, and a gray level correction is made as shown in FIG. 3g with respect to the shadow image, thereby obtaining respective luminance data.

Figure 3H:
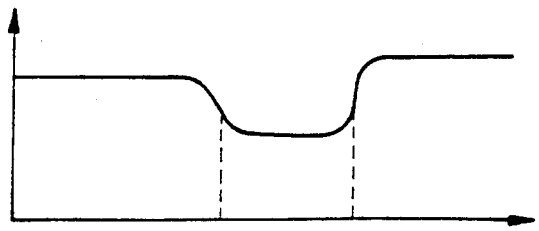
Figure 3I:
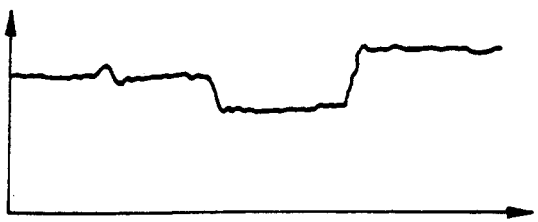

The highlight image and the shadow image subjected to the gray level corrections are synthesized or combined with each other, as shown in FIG. 3h, to generate luminance image data. The generated luminance image data is applied to the adder 21, to obtain digital luminance data having the edge component added thereto, as shown in FIG. 3i. This digital luminance data is applied to the digital matrix circuit 25.

In the digital matrix circuit 25, RGB data is generated from the color difference line sequential data and the digital luminance data Y inputted, to be applied to a print engine processer 26. In the print engine processor 26, cyan data $V_1$, magenta data $M_1$, and yellow data $Y_1$ are generated from the RGB data inputted, to be applied to a thermal head 27. An image of a video signal applied to the video image printer is printed using the thermal head 27.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   low-pass filtering means for removing a high frequency component of digital luminance image data applied;
   high frequency component extracting means for extracting the high frequency component of said digital luminance image data applied;
   driving means for dividing the digital luminance image data whose high frequency component is removed by said low pass filtering means into high luminance image data and low luminance image data using a predetermined threshold value;
   luminance level conversion processing means for separately subjecting said high luminance image data and said low luminance image data obtained by the division by said dividing means to luminance level conversion processing so that the lowest luminance level of said high luminance image data is less than or equal to the highest luminance level of said low luminance image data;
   digital luminance image data generating means for synthesizing said high luminance image data and said low luminance image data subjected to the luminance level conversion processing by said luminance level conversion processing means as well as said high frequency component extracted by said high frequency component extracting means to generate digital luminance image data corresponding to one frame image; and
   still picture image data generating means for generating digital still picture image data from the digital luminance image data generated by said digital luminance image data generating means and digital chrominance component image data concerning a color applied.

2. An image processing apparatus comprising:
   low-pass filtering means for removing a high frequency component of an image signal applied;
   a high frequency component extracting circuit for extracting the high frequency component of said image signal applied;
   dividing means for dividing the image signal whose high frequency component is removed by said low pass filtering means into a high luminance image signal and a low luminance image signal using a predetermined threshold value;
   luminance level conversion processing means for separately subjecting said high luminance image signal and said low luminance image signal obtained by the division by said dividing means to luminance level conversion processing so that the lowest luminance level of said high luminance image signal is less than or equal to the highest luminance level of said low luminance image signal; and
   image signal generating means for synthesizing said high luminance image signal and said low luminance image signal subjected to the luminance level conversion processing by said luminance level conversion processing means as well as said high frequency component extracted by said high frequency component extracting circuit to generate an image signal corresponding to one frame image.

3. An image processing apparatus comprising:
   dividing means for dividing digital luminance image data applied into high luminance image data and low luminance image data using a predetermined threshold value;
   luminance level conversion processing means for separately subjecting said high luminance image data and said low luminance image data obtained by the division by said dividing means to luminance level conversion processing such that the lowest luminance level of said high luminance image data is less than or equal to the highest luminance level of said low luminance image data; and
   digital luminance image data generating means for synthesizing said high luminance image data and said low luminance image data subjected to the luminance level conversion processing by said luminance level conversion processing means to generate digital luminance image data corresponding to one frame image.

4. An image processing method comprising the steps of:
   removing a high frequency component of digital luminance image data applied;
   subtracting from said digital luminance image data applied to digital luminance image data whose high frequency component is removed, to generate a signal representing the high frequency component;
   dividing the digital luminance image data whose high frequency component is removed into high luminance image data and low luminance image data using a predetermined threshold value;
   separately subjecting said high luminance image data and said low luminance image data obtained by the division to luminance level conversion processing so that the lowest luminance level of said high luminance image data is less than or equal to the highest luminance level of said low luminance image data;
   synthesizing said high luminance image data and said low luminance image data subjected to the luminance level conversion processing as well as said high frequency component extracted, to generate digital luminance image data corresponding to one frame image; and
   generating digital still picture image data from the digital luminance image data generated and digital chrominance component image data concerning a color applied.

5. An image processing method comprising the steps of:
   removing a high frequency component of an image signal applied;
   subtracting from said image signal applied the image signal whose high frequency component is removed, to generate a signal representing the high frequency component;

dividing the image signal whose high frequency component is removed into a high luminance image signal and a low luminance image signal using a predetermined threshold value;

separately subjecting said high luminance image signal and said low luminance image signal obtained by the division to luminance level conversion processing so that the lowest luminance level of said high luminance image signal is less than or equal to the highest luminance level of said low luminance image signal; and synthesizing said high luminance image signal and said low luminance image signal subjected to the luminance level conversion processing as well as said high frequency component generated, to generate an image signal corresponding to one frame image.

6. An image processing method comprising the steps of:

dividing digital luminance image data applied into high luminance image data and low luminance image data using a predetermined threshold value;

separately subjecting said high luminance image data and said low luminance image data obtained by the division to luminance level conversion processing such that the lowest luminance level of said high luminance image data is less than or equal to the highest luminance level of said low luminance image data; and synthesizing said high luminance image data and said low luminance image data subjected to the luminance level conversion processing, to generate digital luminance image data corresponding to one frame image.

* * * * *